Patented Oct. 6, 1936

2,056,915

UNITED STATES PATENT OFFICE 2,056,915

PRODUCTION OF CHRYSENE

Carl Wulff, Ludwigshafen-on-the-Rhine, and Max Treppenhauer, Mannheim, Germany, assignors to I. G. Farbenindustrie Aktiengesellschaft, Frankfort-on-the-Main, Germany No Drawing. Application October 4, 1933, Serial No. 692,122. In Germany October 13, 1932

9 Claims. (Cl. 260—168)

The present invention relates to the production of chrysene, in particular by dehydrogenation of indenes and materials containing the same.

It is already known that when indene is led slowly through a glowing iron tube, chrysene is formed. The conversion and yields of chrysene thus obtainable are too small for the industrial manufacture of chrysene.

We have found that a considerable increase in the yields of chrysene is obtained by leading indenes in vapor form over dehydrogenation catalysts at a temperature between about 500° and 850° C. The term "indenes" for the purpose of the present invention also comprises hydrindenes. Thus mixtures of hydrindenes and indenes may be successfully employed as initial materials. Since in this manner the throughput is considerably increased, the total yield of chrysene is much more favorable than when working without catalysts. As catalysts may be mentioned oxides and other compounds, which are not reducible to metal under the working conditions, of metals of the 2nd to the 7th groups of the periodic system, such as magnesium oxide, zinc oxide, aluminium oxide, titanium oxide, vanadium oxide, chromium oxide, molybdenum oxide or manganese oxide, or other compounds, such as sulphides, silicates, phosphates of these metals, either as such or in admixture with each other or precipitated on inert carriers, such as silica gel, pumice stone or bleaching earths. By the term "oxides" we understand also those compounds, such as hydroxides and carbonates, which under the conditions of working are decomposed to the oxides. As examples of catalytic mixtures may be mentioned those of zinc molybdate and magnesium oxide, mixtures of zinc oxide, aluminium oxide and calcium oxide; or molybdenum sulphide precipitated on bleaching earth; or a mixture of magnesium silicate and aluminium phosphate.

A considerable lengthening of the duration of the activity of the catalysts is effected by subjecting them to a pre-treatment with carbonaceous gases or vapors, as for example ethylene, effecting the formation of a coating of lustrous carbon upon them. By this pretreatment also the deposition of carbon black from indene or its conversion products is prevented in the subsequent treatment of indene. If, on the other hand, it is desired to increase the activity of the catalysts, it is preferable to carry out a pretreatment thereof with steam, hydrogen, ammonia, nitrogen, carbon dioxide. These gases are all non-oxidizing gases and have the further common properties of having a simple chemical constitution and of being easily accessible. The same gases may be employed as guide or diluent gases during the reaction itself, whereby the working life of the catalyst is lengthened and the formation of secondary reaction products is suppressed.

The duration of treatment of the indenes is dependent upon the activity of the particular catalyst used and on the temperature employed. At higher temperatures and with more active catalysts shorter durations of treatment are employed than at lower temperatures and with less active catalysts. The duration of treatment may be shortened by the addition of diluent gases or by operating under subatmospheric pressures. For example with a catalyst of a medium activity such as a mixture of zinc oxide and magnesium oxide, about from 2 to 4 kilograms of indene may be passed at between 700° and 720° C. over each liter of the said catalyst. At a temperature between 680° and 700° C. about between 0.5 and 2 kilograms of indene are passed over each liter of the catalyst, while at still lower temperatures still smaller amounts are passed over.

In order to obtain the highest possible total yield of chrysene and to avoid secondary reactions, the conversion of indene during a single passage through the reaction chamber is preferably kept relatively small, advantageously between about 10 and 20 per cent of the indene being converted, which may be effected for example by employing a high speed of flow, for example by passing at a temperature between 680° and 690° C. from 1 to 2 kilograms of indenes per hour over each liter of catalyst, or by the addition of diluent gases, the unconverted indene being returned in circulation. It is even more advantageous to remove the unconverted indene from the reaction mixture by fractional condensation and then to supply it again to the reaction chamber.

The reaction temperature, as already mentioned, should be about 500° C. or more; when employing catalysts coated with lustrous carbon it is usually at from 600° to 750° C. and when employing activated catalysts somewhat lower.

It has also been found that the above described reaction is not only applicable to pure indenes but that also materials containing indenes in admixture with impurities as for example the fractions rich in indene derived from mineral coal tar may be successfully employed for the production of chrysene according to the present invention which application of the process is a great advance from the point of view of economy. Similarly it is possible to start with the cheap indene resins, in which case these are cracked to indene or hydrindenes, the resulting vapors containing indene then being brought into reaction.

In order to suppress the polymerization of the relatively readily polymerizable indene, it is preferable to work in the presence of stabilizers. Thus for example higher organic bases, i. e. bases which are of higher molecular weight or which boil at higher temperatures than indene, as for example para-phenylenediamine, or phenols, as for example dihydroxydiphenyl, or copper compounds, especially copper salts of organic acids, may be added in the vaporizer and in the condensation vessel.

The following examples will further illustrate the nature of this invention but the invention is not restricted to these examples.

Example 1

1000 grams of pure indene are led per hour at a temperature of 690° C. over each liter of a catalyst consisting of magnesium oxide which has been coated with lustrous carbon by treatment with ethylene at 750° C. and which is contained in a reaction chamber lined with copper. A yield of more than 90 per cent of a pale brown colored reaction product is obtained which consists to the extent of 60 per cent of unchanged indene while from the remainder 80 per cent of chrysene may be isolated by sublimation or crystallization.

Example 2

3 kilograms of indene per hour are led at 700° C. over each liter of catalyst consisting of zinc oxide and magnesium oxide which has been coated with lustrous carbon in the manner described in Example 1. A yield of 96 per cent of a reaction product is obtained which contains 40 per cent of chrysene and a small amount of higher condensation products. The remaining 60 per cent consists of unchanged indene which is returned to the reaction. The total yield of chrysene obtained by repeated passage through the reaction chamber amounts to about 90 per cent with reference to the indene employed.

Example 3

1000 grams of a mixture of indene and hydrindenes containing also other aromatic hydrocarbons such as is obtained by distilling a fraction boiling between 175° and 185° C. from a mineral coal tar, are passed over a catalyst in the manner described in Example 2. By one passage over the catalyst, from 25 to 30 per cent of chrysene are obtained in addition to unchanged initial materials. Besides, small amounts of other condensation products are formed from which the indene may be easily separated by distillation or sublimation. The unconverted materials mainly consist of unchanged indene and hydrindenes.

What we claim is:—

1. A process for the production of chrysene which comprises passing a material substantially comprising a substance selected from the group consisting of indene and hydrindene at a temperature of at least 500° C. over a dehydrogenation catalyst which is not reducible to metal under the working conditions.

2. A process for the production of chrysene which comprises passing a material substantially comprising a substance selected from the group consisting of indene and hydrindene at a temperature between 500° and 750° C. over a dehydrogenation catalyst which is not reducible to metal under the working conditions.

3. A process for the production of chrysene which comprises passing a material substantially comprising a substance selected from the group consisting of indene and hydrindene at a temperature between 500° and 750° C. over a substance comprising an essential amount of such compound of a metal from the 2nd to the 7th group of the periodic system as is not reducible to the metal under the conditions of working.

4. A process for the production of chrysene which comprises passing a material substantially comprising a substance selected from the group consisting of indene and hydrindene at a temperature between 500° and 750° C. over a substance comprising an essential amount of such oxide of a metal from the 2nd to the 7th group of the periodic system as is not reducible to the metal under the conditions of working.

5. A process for the production of chrysene which comprises passing a fraction rich in indene derived from mineral coal tar at a temperature of at least 500° C. over a dehydrogenation catalyst which is not reducible to metal under the working conditions.

6. A process for the production of chrysene which comprises passing a material substantially comprising a substance selected from the group consisting of indene and hydrindene at a temperature of at least 500° C. over a dehydrogenation catalyst which is not reducible to metal under the working conditions, the said catalyst being precipitated on an inert carrier.

7. A process for the production of chrysene which comprises passing a material substantially comprising a substance selected from the group consisting of indene and hydrindene at a temperature of at least 500° C. over a dehydrogenation catalyst which is not reducible to metal under the working conditions, the said catalyst being coated with lustrous carbon.

8. A process for the production of chrysene which comprises passing a material substantially comprising a substance selected from the group consisting of indene and hydrindene at a temperature of at least 500° C. over a dehydrogenation catalyst which is not reducible to metal under the working conditions, the said catalyst being pretreated with a gaseous substance of the group consisting of steam, hydrogen, ammonia, nitrogen and carbon dioxide.

9. A process for the production of chrysene which comprises passing a material substantially comprising a substance selected from the group consisting of indene and hydrindene at a temperature of at least 500° C. over a dehydrogenation catalyst which is not reducible to metal under the working conditions, a diluent gas being added to the vaporized initial material.

CARL WULFF.
MAX TREPPENHAUER.